*United States Patent* [19]

Schmieke et al.

[11] Patent Number: 5,957,640
[45] Date of Patent: Sep. 28, 1999

[54] X-DIRECTION LOCKING DEVICE FOR A FREIGHT SECURING SYSTEM IN A FREIGHT OR CARGO HOLD OF AN AIRCRAFT

[75] Inventors: Heinrich Schmieke, Ganderkesee; Volkhard Wendt, Weyhe, both of Germany

[73] Assignee: Daimler Chrysler Aerospace Airbus GmbH, Hamburg, Germany

[21] Appl. No.: 08/922,113

[22] Filed: Aug. 28, 1997

[30] Foreign Application Priority Data

Aug. 29, 1996 [DE] Germany ............... 196 34 791

[51] Int. Cl.⁶ .......................................... B60P 7/08
[52] U.S. Cl. ...................... 410/80; 410/77; 410/94
[58] Field of Search .................. 410/94, 95, 77, 410/80, 78, 8, 104, 105; 244/137.1, 118.1; 248/500, 503; 414/536

[56] References Cited

U.S. PATENT DOCUMENTS

| | | | |
|---|---|---|---|
| 1,470,266 | 10/1923 | Kirchner | 410/77 X |
| 3,210,038 | 10/1965 | Bader et al. | 410/77 |
| 3,693,920 | 9/1972 | Trautman | 410/77 |
| 3,927,622 | 12/1975 | Voigt . | |
| 4,349,302 | 9/1982 | Ferguson, Jr. | 410/78 X |
| 4,379,668 | 4/1983 | Pelletier | 410/77 |
| 4,415,298 | 11/1983 | Voigt . | |
| 4,557,648 | 12/1985 | Koch et al. | 410/78 |
| 4,676,705 | 6/1987 | Kuster et al. | 410/80 |
| 5,000,635 | 3/1991 | Jensen et al. | 410/77 X |
| 5,090,638 | 2/1992 | Eilenstein-Wiegmanns et al. . | |
| 5,112,173 | 5/1992 | Eilenstein et al. . | |
| 5,205,602 | 4/1993 | Heare et al. | 410/95 X |
| 5,234,297 | 8/1993 | Wieck et al. . | |
| 5,302,065 | 4/1994 | Vogg et al. . | |
| 5,316,242 | 5/1994 | Eilenstein-Wiegmann et al. . | |
| 5,346,161 | 9/1994 | Eilenstein-Wiegmann et al. . | |
| 5,356,250 | 10/1994 | Vogg et al. . | |
| 5,397,078 | 3/1995 | Eilenstein-Wiegmann et al. . | |
| 5,564,654 | 10/1996 | Nordstrom | 410/80 X |
| 5,618,139 | 4/1997 | Graf et al. | 410/94 X |
| 5,692,862 | 12/1997 | Hilde | 410/90 X |
| 5,749,686 | 5/1998 | Butcher et al. | 410/94 |

FOREIGN PATENT DOCUMENTS

507010A1  10/1992  European Pat. Off. ............ 244/118.1

*Primary Examiner*—Stephen T. Gordon
*Attorney, Agent, or Firm*—W. F. Fasse; W. G. Fasse

[57] ABSTRACT

In a system for locking freight or cargo, especially in the freight hold of an aircraft, including guide rails along which the units of freight are guided, and YZ-locking devices for securing or locking the freight units against motion in the Y- and Z-directions, one or more X-locking devices are further provided for locking the freight units against motion in the X-direction. The X-locking devices are mounted directly on the guide rails, which are arranged between respective YZ-locking devices. Each X-locking device includes a mounting base (5) that is fixedly mounted on the guide rail (1), and a locking member (6) that is pivotally connected to the mounting base (5) so as to be tiltable or pivotable about an axis (7) extending parallel to the lengthwise extension of the guide rail (1) or X-direction. The locking member preferably has a U- or L-shaped configuration to reach over and behind the guide rail in a locking position, whereby it acts as a locking stop to prevent X-direction motion of the freight unit. Alternatively, the locking member is tiltable into a non-locking position clear of the freight unit, so that the freight unit may be slidingly moved in the X-direction along and between the guide rails.

20 Claims, 3 Drawing Sheets

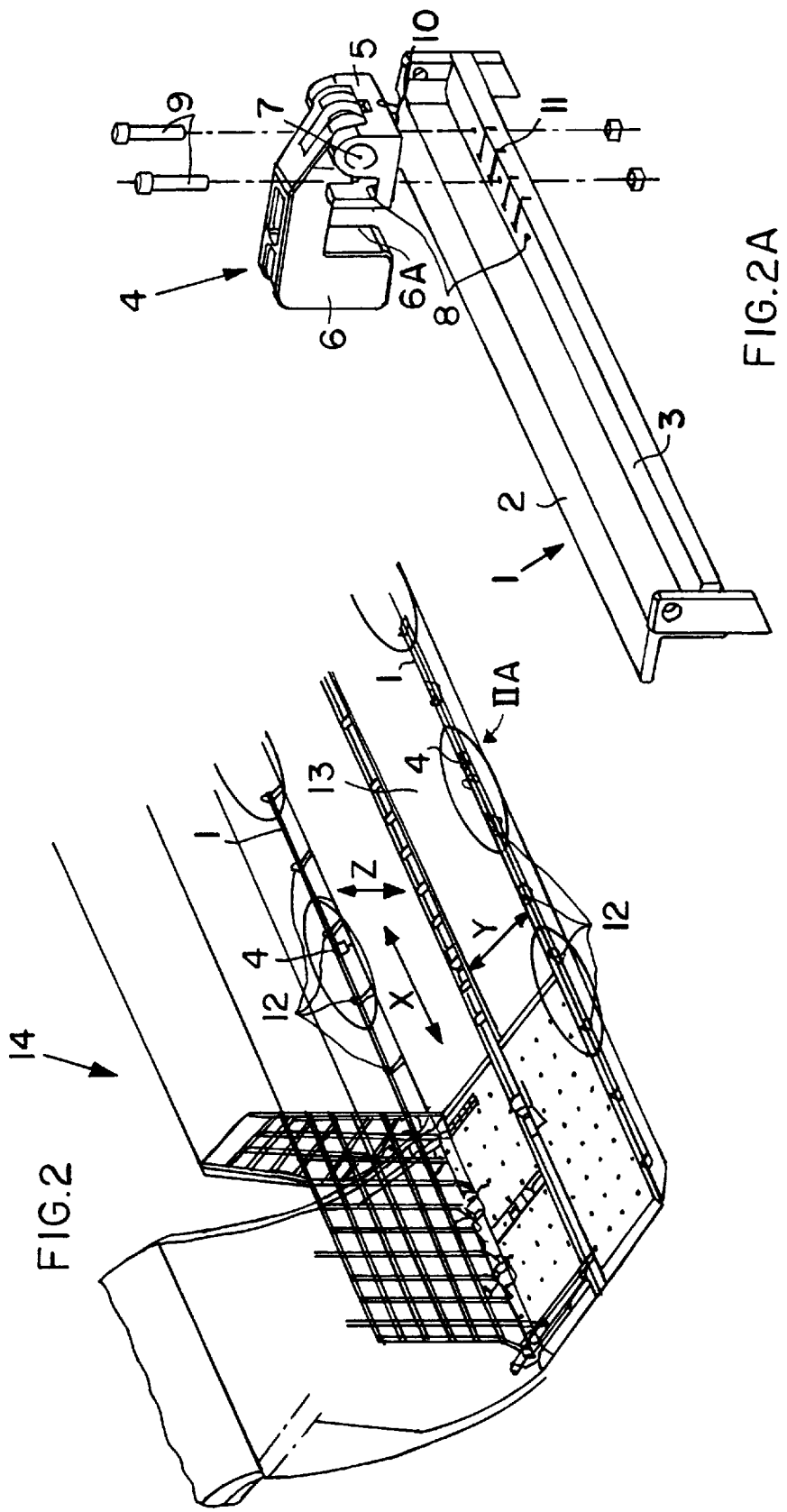

X-DIRECTION LOCKING DEVICE FOR A FREIGHT SECURING SYSTEM IN A FREIGHT OR CARGO HOLD OF AN AIRCRAFT

FIELD OF THE INVENTION

The invention relates to a device for locking or securing a piece of air freight or cargo, and particularly a standard freight container, against movement in the X-direction, as a component of a freight securing system in a freight or cargo hold of an aircraft. The system further includes YZ-locking devices for locking the piece of freight in the Y- and Z-directions of the aircraft, and guide rails fixedly arranged along the floor of the freight hold at positions between respective ones of the YZ-locking devices. The pieces of freight each have a base rim that engages the guide rails for laterally guiding the piece of freight. In this application, the pieces of freight will be referred to as "containers", but it should be understood that other freight items, for example freight loaded on pallets, are also intended to be covered by the general term "containers".

BACKGROUND INFORMATION

It is generally known to use latch devices for locking pieces of air freight such as freight containers in the X-direction, in a freight loading and securing system installed in the freight or cargo hold of an aircraft. The X-direction is parallel to the lengthwise roll axis of the aircraft, while the Y-direction is parallel to the crosswise or lateral pitch axis of the aircraft, and the Z-direction is parallel to the vertical or yaw axis of the aircraft. Such X-direction locking devices or X-latches are typically installed on the roller tracks or contact rails which are provided for supporting the freight containers and which extend in the lengthwise or X-direction of the aircraft. However, in order to install such known X-latches, significant work effort and revisions are required in the other existing components of the freight securing system. Furthermore, the structure of the freight securing system must be reinforced or strengthened in the area below the roller tracks, and particularly the connections thereof to the aircraft structure, in view of the additional loads transmitted through the X-latches.

German Patent Publication DE 4,021,499 C1 and corresponding U.S. Pat. No. 5,090,638 (Eilenstein-Wiegmanns et al.) discloses a locking mechanism for securing freight pieces in the freight hold of an aircraft. The known locking mechanisms are respectively arranged in a housing that can be selectively installed in recesses provided at various locations or positions in the freight loading floor of the freight hold. While a piece of freight such as a freight container can roll over the known locking mechanism in one direction, whereby the locking mechanism is automatically pushed down into a recessed position, in order to roll the freight over the locking mechanism in the other direction, the mechanism must be recessed down into its housing. The known locking mechanism comprises a latching member that is pivotally mounted in the housing, and a latch operating member connected to the latching member via a cam and guide track arrangement and a tension spring. Two stop members are provided respectively on the latching member and the latch operating member to prevent the latching member from tilting if the latch operating member has not previously been operated or repositioned. While this known latching or locking mechanism effectively achieves its intended objects and functions in actual practice, it has been found that the structure and installation of an X-direction locking mechanism can and should still be simplified. It is especially desirable to simplify an X-locking device in such a manner that it can more easily be retrofitted into existing freight loading and securing systems, without requiring recessed floor pockets and without requiring reinforcement of the original structures.

SUMMARY OF THE INVENTION

In view of the above, it is an object of the invention to provide an X-direction locking device of the above described general type, which can be mounted on or integrated in freight guide rails, and which can be installed at locations between respective YZ-locking devices of a freight securing system on a freight loading floor of an aircraft. Further objects of the invention are to avoid the disadvantages of the prior art and to achieve further advantages, which are evident from the present application.

The above objects have been achieved according to the invention, in that X-locking devices for locking or securing a freight unit such as a container against movement in the X-direction of an aircraft are mounted directly on the freight guide rails of the freight loading and securing system. More particularly, an X-locking device according to the invention includes a mounting base that is rigidly or fixedly mounted on the guide rail, and a locking member pivotally connected to the mounting base so as to be pivotal about an axis extending parallel to the guide rail. The locking member can be pivoted between a first locking position and a second unlocking position. In the first locking position, the locking member is positioned to protrude directly in front of (in the X-direction) a front side of a base rim of the freight container and thereby prevent the container from moving in the X-direction. On the other hand, in the second unlocking position, the locking member is tilted clear away from the freight container so that the freight container may be moved in the X-direction between and along the guide rails.

One advantage of the invention is that the connection between the guide rails and the YZ-locking elements is carried out in a load bearing and load transmitting manner. Thus, all of the locking mechanism loads are transmitted into and distributed over several frame or rib member fields by the existing structural arrangements. Additional structural measures are not necessary, since the same load bearing understructures are used for bearing all of the loads of the X-, Y-, and Z-locking. A further advantage of the invention is that the present X-locking devices may be easily and quickly installed on the existing components without any problems, in the event that the present X-locking devices are to be retrofitted in an existing freight loading and securing system. Most importantly, the present X-locking devices require considerably less effort and expense for alterations in the standard freight loading and securing system than were necessary for using prior art X-locking devices. It should be understood that the guide rails and the Y- and Z-locking devices used in connection with the present X-locking device in the present system can be of any known configuration or embodiment of such guide rails and Y- and Z-locking devices.

According to a particular embodiment of the invention, the X-locking device is connected to the guide rail in a form-locking manner, for example using a form-lock flange or rib provided on the base member of the locking device which engages a selected form-lock groove provided on the guide rail, or vice versa. In this manner, the X-direction forces or loads applied to the X-locking device are positively and surely transmitted into the guide rail.

The invention further provides that the guide rail may have a plurality of selectable mounting positions distributed along its lengthwise axis, so that the respective X-locking devices may be variously positioned as needed in the X-direction of the aircraft by mounting the X-locking devices at any selected mounting position. The several mounting positions, for example, comprise a plurality of the above mentioned form-lock grooves and a plurality of bolt holes into which the locking device may be bolted. In this manner, various different locking positions for different sizes or layouts of freight containers may advantageously be achieved using the same locking device and rail combination.

In a further detailed embodiment of the invention, the freight container or the like includes a base rim and the guide rail includes a guide flange that overlaps or engages the base rim of the freight container. The tiltable locking member of the locking device has a generally L- or U-shaped locking pawl with a U-shaped clearance throat therein. When the locking member is in the locking position, the locking pawl reaches over and around the guide flange of the guide rail, which is received in the clearance throat in such a manner, so that the locking pawl reaches lockingly in front of the base rim of the freight container without requiring any break or interruption in the continuously extending configuration of the guide rail.

BRIEF DESCRIPTION OF THE DRAWINGS

In order that the invention may be clearly understood, it will now be described in connection with an example embodiment, with reference to the drawings, wherein:

FIG. 2 is a schematic perspective view of a larger portion of the freight loading and securing system including a guide rail with an X-locking device, on a freight loading floor in a freight hold of an aircraft;

FIG. 2A corresponds generally to a portion of FIG. 1 and represents a detail view of the detail area IIA in FIG. 2;

DETAILED DESCRIPTION OF PREFERRED EXAMPLE EMBODIMENTS AND OF THE BEST MODE OF THE INVENTION

Figure 1:
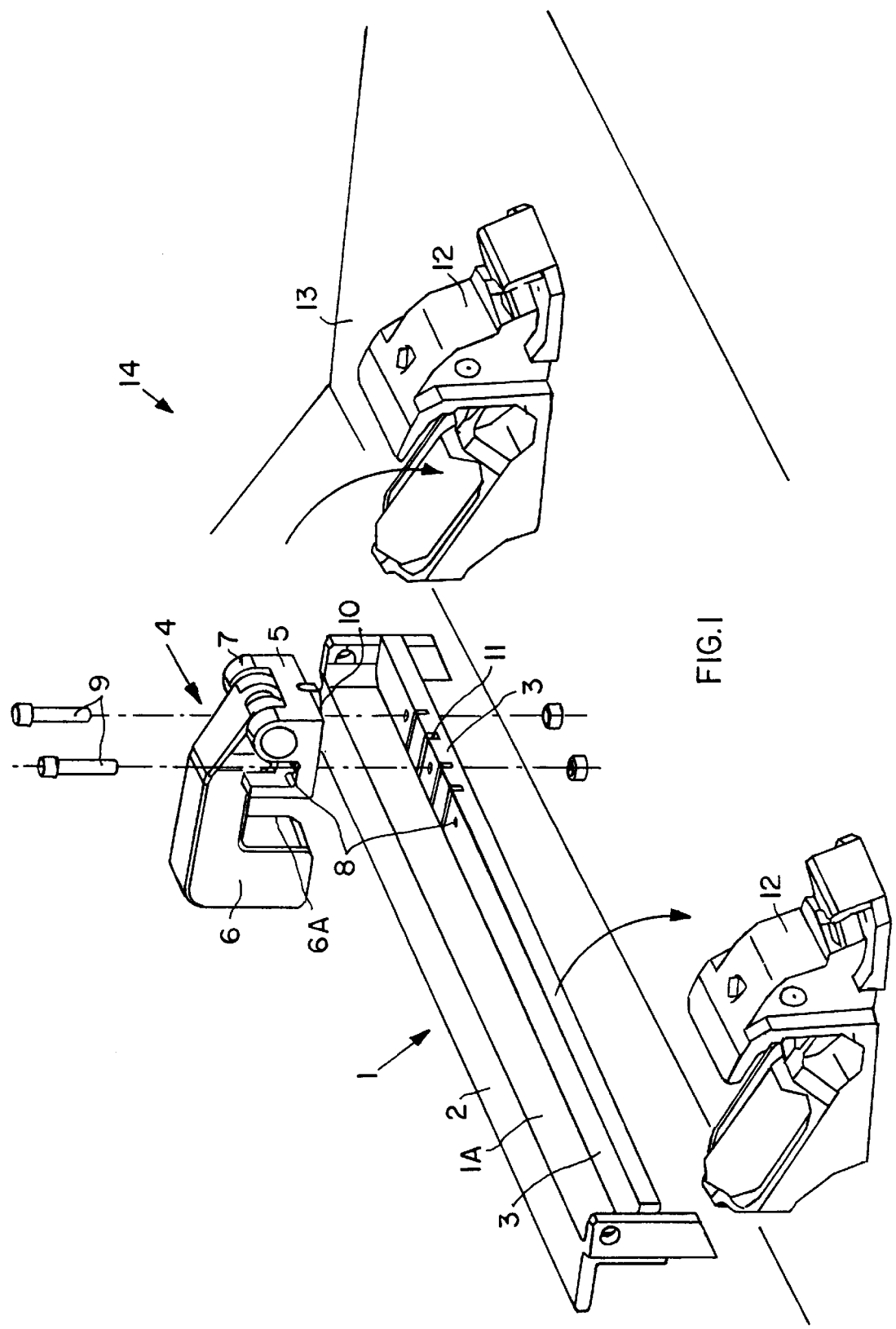
FIG. 1 is a schematic perspective view of a portion of a freight loading and securing system including a guide rail, two YZ-locking devices, and one X-locking device, according to the invention.

As shown in FIG. 1, a freight loading guide rail 1 includes a substantially vertical rail web 1A extending longitudinally, a guide flange 2 extending longitudinally along the top edge of the rail web 1A, and a mounting flange 3 extending along the web 1A, for example at a bottom edge thereof, substantially parallel to the guide flange 2. The guide flange may be a part of a separate guide element 2A attached to the guide rail web 1A (see FIG. 3A). The guide rail 1 may be mounted on the freight loading floor of a freight hold 13 of an aircraft 14, and particularly is mounted so that loads are transmitted into the frame members of the aircraft fuselage. The guide rail 1 may be mounted on, in connection with, or adjacent YZ-locking devices 12 in any known manner, whereby the YZ-locking devices 12 my also have any known configuration or construction.

An X-locking device 4 may be rigidly or fixedly mounted in a form-locking manner at a selected position along the mounting flange 3 of the guide rail 1. The X-locking device 4 includes a mounting member or base 5 that is mounted on the mounting flange 3, and a locking member 6 that is pivotally connected to the mounting base 5 so as to be pivotal about an axis 7 extending in parallel to the guide rail 1. In a particularly simple embodiment, the device does not require any spring or other element rotationally urging or detenting the locking member 6, but rather the locking member 6 simply remains in its selected position by friction or by gravitational force. The locking member 6 is preferably configured as a substantially L-shaped or U-shaped locking pawl or finger, with a U-shaped throat 6A between the mounting base 5 or the pivot axis 7 and the free end of the locking pawl.

The mechanical connection between the mounting member or base 5 of the X-locking device 4 onto the mounting flange 3 of the guide rail 1 can be achieved by through-bored holes 8 provided in the respective components and corresponding threaded bolts 9 installed through these holes 8. Additionally, a form-locking and force-transmitting connection between the X-locking device 4 and the guide rail 1 can be achieved by providing a form-lock flange or rib 10 protruding from the bottom surface of the mounting base 5 which contacts the mounting flange 3 of the guide rail 1, and providing a form-lock groove 11 in the mounting flange 3 to receive the form-lock flange or rib 10. Namely, the form-lock flange or rib 10 is engaged in the form-lock groove 11, which respectively extend perpendicularly to the X-direction, so as to transmit X-direction forces from the X-locking device 4 into the guide rail 1. Alternatively, the rib 10 may be provided on the rail while the groove 11 may be provided on the mounting base 5.

The above described mounting means may be repetitively provided along the mounting flange 3, in a plurality of groups displaced from one another in the lengthwise or X-direction of the guide rail 1. Thus, the X-locking device 4 may be mounted at any selected one of a plurality of possible mounting positions along the X-direction of the aircraft on the guide rail 1. Namely, a plurality of the above described bolt holes 8 and form-lock grooves 11 may be provided along the mounting flange 3, so that the X-locking device 4 can be aligned with and mounted by means of any selected set of the form-lock grooves 11 and bolt holes 8. In this manner, various locking positions and locking configurations can be achieved for efficiently securing different sizes and different combinations of freight units such as freight containers, using the same locking devices and guide rail combination.

As shown further in connection with FIG. 2 and FIG. 2A (wherein FIG. 2A essentially corresponds to a portion of above described FIG. 1), a locking system using the present locking devices is arranged on the freight loading floor of a freight: hold 13 in an aircraft 14. A guide rail 1 with an X-locking device 4 is respectively arranged between two YZ-locking devices 12 in the freight loading and securing system. The freight loading and locking system comprises a plurality of the X-locking devices 4 mounted along the guide rail 1 as described above. As shown in FIG. 2, the guide rails 1 extend along the lengthwise or X-direction of the aircraft 14, while the Y-direction is a lateral or crosswise direction, and the X-direction is a vertical direction relative to the guide rails.

Figure 3A:
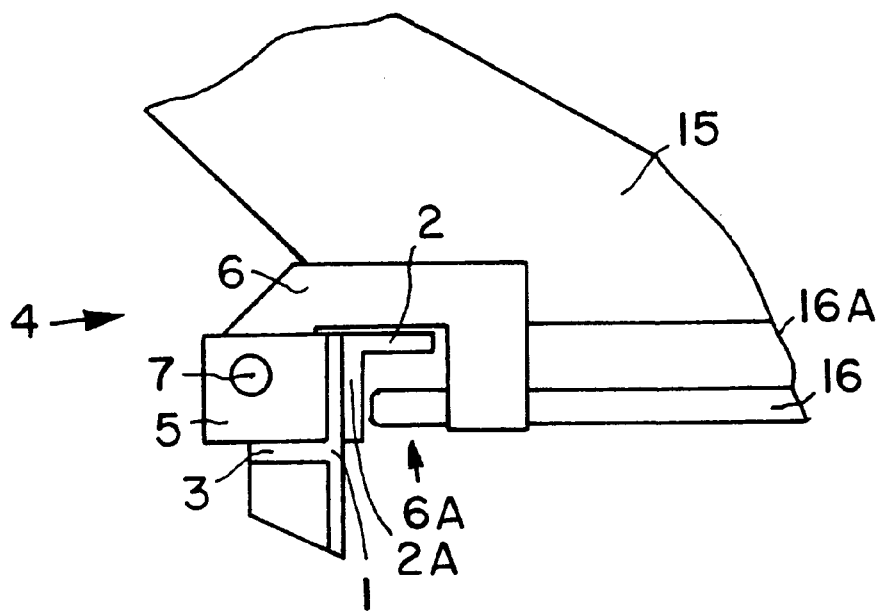
FIG. 3A is a schematic end view in the X-direction of the X-locking device according to the invention in a locking position so as to secure a freight container.
Figure 3B:
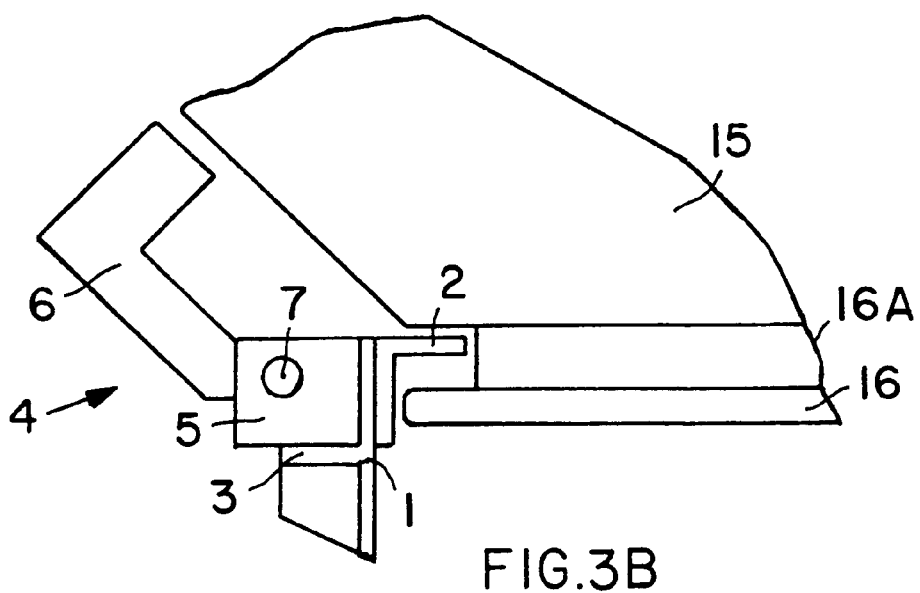
FIG. 3B is a view similar to that of FIG. 3A, but showing the X-locking device in an unlocking position in which the freight container is free to move in the X-direction.

FIGS. 3A and 3B show the position of a freight container 15 arranged on a guide rail 1, with the X-locking device 4 respectively in a locking position in FIG. 3A and in an non-locking position in FIG. 3B. As shown in both FIGS. 3A and 3B, the freight container 15 includes a base rim 16 projecting laterally outwardly from a base groove 16A around the bottom perimeter of the container 15. The guide flange 2 of the guide rail 1 extends into the base groove 16A, with the base rim 16 reaching under the guide flange 2, such that the freight container 15 is slidably and guidedly engaged with the guide rail 1. This arrangement provides Y- and Z-direction guidance and securing of the freight container 15, i.e. effectively provides a YZ locking element, and can be used without further or additional YZ locking devices 12.

Referring to FIG. 3A, the freight container 15 is locked against movement in the X-direction when the tiltable or pivotable locking member 6 is pivoted to a locking position in front of the end face of the bottom perimeter of the freight container 15 and the base rim 16, whereby the U-shaped groove or throat 6A of the locking member 6 reaches over the guide flange 2 of the guide rail 1. In this manner, the preferably L-shaped locking member 6 reaches down beside the guide rail 1 to act as a stop against which the base rim 16 of the freight container 15 is locked. In the non-locking state shown in FIG. 3B, the tiltable locking member 6 of the X-locking device 4 is tilted up and back away from the base rim 16 of the freight container 15, and also clear of the side wall of the freight container 15, so that the freight container 15 may be slidingly moved in the X-direction along and between two respective guide rails 1 in the freight hold 13 of the aircraft 14.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A freight securing system for securing freight against movement, comprising:

a guide rail extending lengthwise in an X-direction and adapted to guide the freight therealong, a YZ locking device adapted to secure the freight against movement in two mutually perpendicular Y- and Z-directions that are perpendicular to said X-direction, and an X locking device mounted on said guide rail and adapted to secure the freight against movement in said X--direction;

wherein said X locking device comprises a mounting base fixedly mounted on said guide rail and a locking member pivotally connected to said mounting base at a pivot axis extending in said X-direction so that said locking member is pivotable about said pivot axis between a locking position in which said locking member is adapted to block the freight against movement in said X-direction and an unlocking position in which said locking member is adapted to be clear of and not block the freight for movement in said X-direction;

wherein said guide rail comprises a substantially vertical rail web having a top edge and a bottom edge, a substantially horizontal guide flange extending from and along said top edge of said rail web in a first direction on a first side thereof, and a substantially horizontal mounting flange extending from and along said bottom edge of said rail web in a second direction opposite said first direction on a second side of said rail web opposite said first side; and wherein said mounting base of said X locking device is mounted on said mounting flange, and said locking member in said locking position reaches across and over said rail web and said guide flange.

2. The freight securing system of claim 1, comprising a plurality of said guide rails and a plurality of said YZ locking devices, and further comprising a freight loading floor, wherein said guide rails are rigidly mounted on said freight loading floor respectively between respective pairs of said YZ locking devices.

3. freight securing system of claim 1, wherein the freight includes a freight unit selected from a freight container and a freight pallet, the freight unit has a base rim protruding outwardly at a bottom perimeter of the freight unit, and said locking member in said locking position is adapted to blockingly contact the base rim of the freight unit so as to block movement of the freight unit in said X-direction.

4. The freight securing system of claim 3, wherein said YZ Locking device is formed by at least a part of said substantially horizontal guide flange and a substantially vertical guide surface provided on said rail web below said guide flange, and wherein said guide flange and said guide surface are adapted to guidingly engage the base rim of the freight unit so as to prevent movement of the freight unit in said Y- and Z-directions.

5. The freight securing system of claim 1, wherein a base surface of said mounting base comprises a force-locking surface configuration selected from a grooved extending perpendicular to said X-direction and a protruding rib extending perpendicular to said X-direction.

6. The freight securing system of claim 1, wherein said X locking device does not comprise any element mechanically urging or detenting said locking member pivotally about said pivot axis, and wherein said locking member is adapted to remain in a selected one of said locking and unlocking positions by gravitational force.

7. The freight securing system of claim 1, comprising respective pairs of said YZ locking devices arranged with said guide rail therebetween, and respectively connected to said guide rail.

8. The freight securing system of claim 1, further comprising threaded bolts, wherein said mounting base of said X locking device is removably mounted on said guide rail by said threaded bolts arranged in holes respectively provided in said mounting base and said guide rail.

9. The freight securing system of claim 8, wherein said mounting base and said guide rail comprise respective mating surface configurations that provide a form-locking connection between said mounting base and said guide rail at least in said X-direction.

10. The freight securing system of claim 1, wherein said mounting base and said guide rail comprise respective mating surface configurations that provide a form-locking connection between said mounting base and said guide rail at least in said X-direction.

11. The freight securing system of claim 10, wherein said respective mating surface configurations comprise a form-lock groove and a form-lock rib that is form-fitting into said form-lock groove, and wherein said form-lock groove and said form-lock rib have a major extension axis perpendicular to said X-direction.

12. The freight securing system of claim 1, further comprising a plurality of mounting means for removably and selectively mounting said X locking device at any selected one of a plurality of mounting locations provided along said guide rail in said X-direction.

13. The freight securing system of claim 12, wherein said mounting means comprise at least one bolt, at least one bolt hole provided in said guide rail at each said mounting location, and at least one bolt hole provided in said mounting base of said X locking device.

14. The freight securing system of claim 13, wherein said mounting means further comprise respective mating surface configurations provided on said mounting base and on said guide rail at each said mounting location.

15. The freight securing system of claim 14, wherein said respective mating surface configurations comprise a form-lock groove and a form-lock rib that is form-fitting into said form-lock groove, and wherein said form-lock groove and said form-lock rib have a major extension axis perpendicular to said X-direction.

16. The freight securing system of claim 1, wherein said locking member comprises a U-shaped or L-shaped locking pawl with a clearance throat between a free end of said locking pawl and said pivot axis, said locking pawl reaches over and around said guide rail with said guide rail received in said clearance throat when said locking member is in said locking position, and said guide rail has a continuous uniform configuration extending without interruption through said clearance throat.

17. The freight securing system of claim 16, wherein the freight includes a base rim protruding outwardly at a bottom perimeter thereof, wherein said guide flange of said guide rail is adapted to overlap the base rim of the freight, and wherein said locking pawl reaches over and around said guide flange with said guide flange received in said clearance throat and is adapted to blockingly contact the base rim of the freight when said locking member is in said locking position.

18. A freight securing system for securing freight against movement, comprising:
  a guide rail extending lengthwise in an X-direction and adapted to guide the freight therealong,
  a YZ locking device adapted to secure the freight against movement in two mutually perpendicular Y- and Z-directions that are perpendicular to said X-direction, and
  an X locking device mounted on said guide rail and adapted to secure the freight against movement in said X-direction;
  wherein said X locking device comprises a mounting base fixedly mounted on said guide rail and a locking member pivotally connected to said mounting base at a pivot axis extending in said X-direction so that said locking member is pivotable about said pivot axis between a locking position in which said locking member is adapted to block the freight against movement in said X-direction and an unlocking position in which said locking member is adapted to be clear of and not block the freight for movement in said X-direction;
  wherein the freight includes a freight unit selected from a freight container and a freight pallet, the freight unit has a base rim protruding outwardly at a bottom perimeter of the freight unit, and said locking member in said locking position is adapted to blockingly contact the base rim of the freight unit so as to block movement of the freight unit in said X-direction;
  wherein said guide rail comprises a substantially vertical rail web, said YZ locking device comprises a substantially horizontal guide flange extending laterally from and along a top edge of said rail web and a substantially vertical guide surface provided on said rail web below said guide flange; and
  wherein said guide flange and said guide surface are adapted to guidingly engage the base rim of the freight unit so as to prevent movement of the freight unit in said Y- and Z-directions.

19. A freight securing system for securing freight against movement, comprising:
  a guide rail extending lengthwise in an X-direction and adapted to guide the freight therealong,
  a YZ locking device adapted to secure the freight against movement in two mutually perpendicular Y- and Z-directions that are perpendicular to said X-direction, and
  an X locking device mounted on said guide rail and adapted to secure the freight against movement in said X-direction;
  wherein said X locking device comprises a mounting base fixedly mounted on said guide rail and a locking member pivotally connected to said mounting base at a pivot axis extending in said X-direction so that said locking member is pivotable about said pivot axis between a locking position in which said locking member is adapted to block the freight against movement in said X-direction and an unlocking position in which said locking member is adapted to be clear of and not block the freight for movement in said X-direction;
  wherein said mounting base and said guide rail comprise respective mating surface configurations that provide a form-locking connection between said mounting base and said guide rail at least in said X-direction;
  wherein said respective mating surface configurations comprise a form-lock groove and a form-lock rib that is form-fitting into said form-lock groove, and
  wherein said form-lock groove and said form-lock rib have a major extension axis perpendicular to said X-direction.

20. A freight securing system for securing freight against movement, comprising a guide rail extending lengthwise in an X-direction and adapted to guide the freight therealong, a YZ locking device adapted to secure the freight against movement in two mutually perpendicular Y- and Z-directions that are perpendicular to said X-direction, and an X locking device mounted on said guide rail and adapted to secure the freight against movement in said X-direction,
  wherein said X locking device comprises a mounting base fixedly mounted on said guide rail and a locking member pivotally connected to said mounting base at a pivot axis extending in said X-direction so that said locking member is pivotable about said pivot axis between a locking position in which said locking member is adapted to block the freight against movement in said X-direction and an unlocking position in which said locking member is adapted to be clear of and not block the freight for movement in said X-direction, said locking member comprises a U-shaped or L-shaped locking pawl with a clearance throat between a free end of said locking pawl and said pivot axis, said locking pawl reaches over and around said guide rail with said guide rail received in said clearance throat when said locking member is in said locking position, and said guide rail has a continuous uniform configuration extending without interruption through said clearance throat.

* * * * *